US012659303B2

(12) United States Patent  
Yakabe

(10) Patent No.: US 12,659,303 B2  
(45) Date of Patent: Jun. 16, 2026

(54) ELECTRONIC CONTROL UNIT, AUTHENTICATION METHOD, AND NON-TRANSITORY COMPUTER-READABLE STORAGE MEDIUM STORING AUTHENTICATION PROGRAM

(71) Applicant: DENSO CORPORATION, Kariya City (JP)

(72) Inventor: Hideki Yakabe, Kariya City (JP)

(73) Assignee: DENSO CORPORATION, Kariya-city (JP)

( * ) Notice: Subject to any disclaimer, the term of this patent is extended or adjusted under 35 U.S.C. 154(b) by 33 days.

(21) Appl. No.: 18/628,861

(22) Filed: Apr. 8, 2024

(65) Prior Publication Data

US 2024/0348591 A1 Oct. 17, 2024

(30) Foreign Application Priority Data

Apr. 12, 2023 (JP) ................................. 2023-065145

(51) Int. Cl.  
*H04L 9/40* (2022.01)

(52) U.S. Cl.  
CPC ............ *H04L 63/08* (2013.01); *H04L 63/105* (2013.01)

(58) Field of Classification Search  
USPC .......................................................... 726/6  
See application file for complete search history.

(56) References Cited

U.S. PATENT DOCUMENTS

| | | | | |
|---|---|---|---|---|
| 8,971,447 | B1 * | 3/2015 | Kao | .................... H04L 25/0314 |
| | | | | 375/232 |
| 9,252,792 | B2 * | 2/2016 | Thinakaran | .......... H03K 3/0315 |
| 11,196,560 | B2 * | 12/2021 | Chengalvala | ........... H04L 63/20 |
| 2015/0256556 | A1 * | 9/2015 | Kaminsky | ............. H04L 63/168 |
| | | | | 726/23 |
| 2015/0288524 | A1 | 10/2015 | Jaffe | |
| 2015/0346246 | A1 | 12/2015 | Tasher et al. | |
| 2017/0244546 | A1 | 8/2017 | Stark | |
| 2019/0312871 | A1 * | 10/2019 | Syomichev | ........... H04L 63/105 |
| 2021/0194667 | A1 | 6/2021 | Stark | |

FOREIGN PATENT DOCUMENTS

| | | | | | |
|---|---|---|---|---|---|
| CN | 111431901 | A | * | 7/2020 | ........... H04L 9/3247 |
| CN | 112291064 | A | * | 1/2021 | ......... H04L 63/0823 |
| JP | 2015-534419 | A | | 11/2015 | |
| JP | 2015-228639 | A | | 12/2015 | |
| JP | 2020-058034 | A | | 4/2020 | |
| JP | 2022172215 | | * | 11/2022 | ............. H04L 12/22 |

OTHER PUBLICATIONS

Kama et al "JULIET-PUF: Enhancing the Security of IoT-Based SRAM-PUFs Using the Remanence Decay Effect", Jul. 15, 2023, IEEE Internet of Things Journal, vol. 10, No. 14, pp. 12715-12727 (Year: 2023).*

* cited by examiner

*Primary Examiner* — Sakinah White-Taylor  
(74) *Attorney, Agent, or Firm* — Harness, Dickey & Pierce, 1PLC

(57) ABSTRACT

By an electronic control unit, an electronic control system, an authentication method, a non-transitory computer-readable storage medium storing an authentication program, an authentication request is acquired from a different device, a timing of execution of an authentication process according to the authentication request is randomly determined, the authentication process is executed at the determined timing determined.

17 Claims, 8 Drawing Sheets

Figure 5:
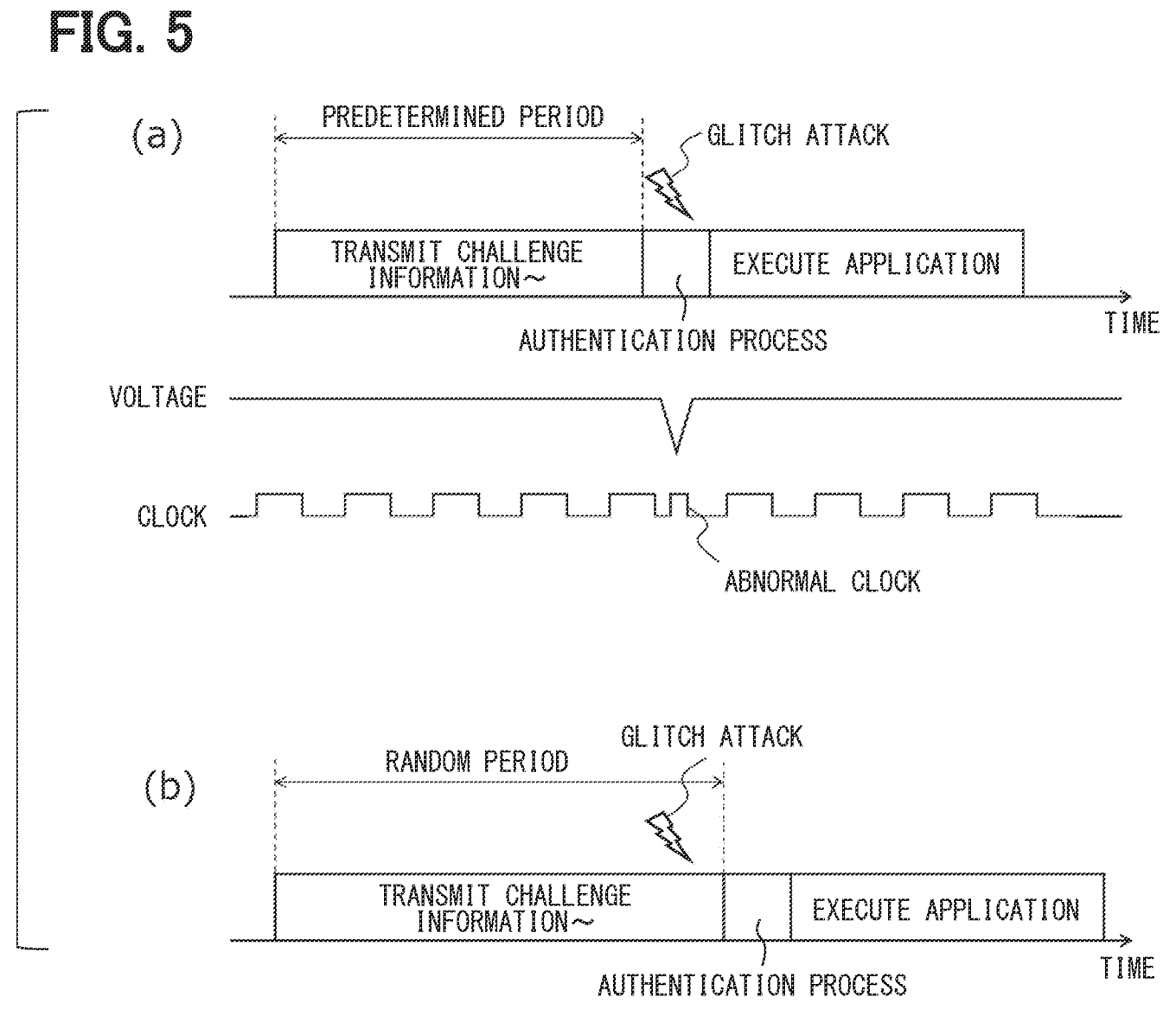

PREDETERMINED PERIOD

GLITCH ATTACK

TRANSMIT CHALLENGE INFORMATION~

EXECUTE APPLICATION

AUTHENTICATION PROCESS

TIME

VOLTAGE

CLOCK

ABNORMAL CLOCK (b)

RANDOM PERIOD

GLITCH ATTACK

TRANSMIT CHALLENGE INFORMATION~

EXECUTE APPLICATION

AUTHENTICATION PROCESS

TIME

Ⓐ

S211 — GENERATE CHALLENGE INFORMATION

S212 — TRANSMIT CHALLENGE INFORMATION

S213 — RECEIVE RESPONSE INFORMATION

Ⓑ

S

FIRST LAYER　　　SECOND LAYER　　　THIRD LAYER

ELECTRONIC CONTROL UNIT, AUTHENTICATION METHOD, AND NON-TRANSITORY COMPUTER-READABLE STORAGE MEDIUM STORING AUTHENTICATION PROGRAM

CROSS REFERENCE TO RELATED APPLICATION

The present application claims the benefit of priority from Japanese Patent Application No. 2023-065145 filed on Apr. 12, 2023. The entire disclosure of the above application is incorporated herein by reference.

TECHNICAL FIELD

The present disclosure mainly relates to an electronic control unit that executes an authentication process, an authentication method, and a non-transitory computer-readable storage medium storing an authentication program executed by the electronic control unit.

BACKGROUND

With the development of the so-called IoT (Internet of Things), which connects various devices to networks, the need for countermeasures against cyber attacks is increasing. One type of the cyber attacks is a glitch attack, which is a type of fault injection attack. The glitch attack is known as an attack that causes a device to malfunction by injecting an abnormality called a glitch into the device. For example, an attacker injects a voltage or clock into an electronic control unit as a glitch. When such a glitch attack occurs, processing that was scheduled to be executed at that clock may be skipped.

As a countermeasure against the glitch attack, it is conceivable to mount a voltage sensor or a clock sensor on the device, for example. The voltage sensor or the clock sensor can detect the glitch attack by detecting a glitch injected by an attack. In a comparative example, a supply voltage glitch detector is provided in a monolithic integrated circuit device to detect glitches in the supply voltage.

Further, as another measure against the glitch attack, there is a method of duplicating an authentication process. With this method, the attacker is required to execute a glitch attack at each timing of two authentication processes. Therefore, it is possible to significantly reduce the possibility of a successful attack.

SUMMARY

By an electronic control unit, an electronic control system, an authentication method, a non-transitory computer-readable storage medium storing an authentication program, an authentication request is acquired from a different device, a timing of execution of an authentication process according to the authentication request is randomly determined, the authentication process is executed at the determined timing determined.

BRIEF DESCRIPTION OF THE DRAWINGS

FIG. 5 is a diagram for illustrating a relationship between an authentication process of the electronic control unit and a glitch attack.

DETAILED DESCRIPTION

Figure 1A:
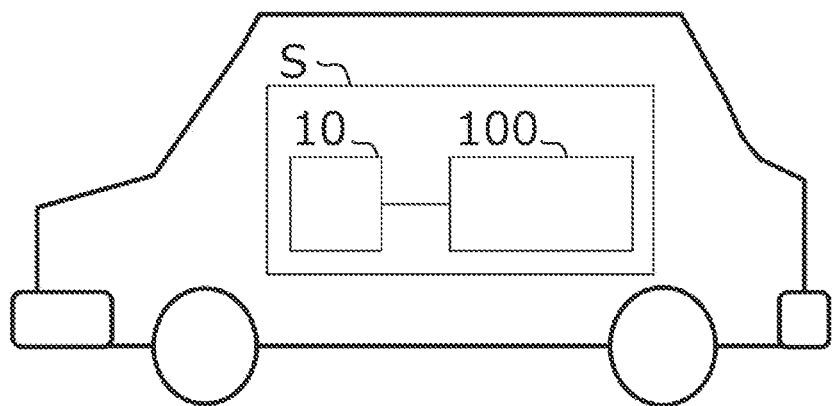
FIGS. 1A and 1B are diagrams for illustrating arrangement of an electronic control unit according to each embodiment.

Here, the inventor of the present disclosure has found the following difficulty as a result of detailed study. In the method of detecting glitches using the voltage sensor or the like, it is necessary to install the voltage sensor or the like in the device, and this involves changing the hardware. Therefore, the installation cost increases. Further, although this method can detect the glitch attack, it cannot prevent the glitch attack itself. On the other hand, the method of duplicating the authentication process to prevent the glitch attack requires, in addition to increasing the communication time required for authentication by executing the authentication process twice, changes of communication specifications or program rewriting in not only the device executing the authentication process but also the authenticated device. Therefore, it is desirable to prevent the glitch attack without changing hardware or increasing communication time.

Therefore, one example of the present disclosure provides an electronic control unit and the like capable of preventing glitch attacks using a simple method without changing the hardware or increasing communication time.

According to one example of the present disclosure, an electronic control unit includes: a request acquisition unit configured to acquire an authentication request from a different device; a timing determination unit configured to randomly determine a timing of execution of an authentication process according to the authentication request; and an authentication unit configured to execute the authentication process at the timing determined by the timing determination unit.

Further, according to another example embodiment, an electronic control system includes: a first electronic control unit; and a second electronic control unit. The first electronic control unit includes: a first request acquisition unit configured to acquire a first authentication request; a timing determination unit configured to randomly determine a timing of execution of an authentication process according to the first authentication request when the first authentication request is acquired; and a first authentication unit configured to execute the first authentication process at the timing determined by the timing determination unit. The second electronic control unit includes: a second request acquisition unit configured to acquire a second authentication request; a second authentication unit configured to immediately execute a second authentication process on the second authentication request when the second authentication request is acquired.

Further, according to another example embodiment, an authentication method is executed by an electronic control unit, and the method includes: acquiring an authentication request from a different device; randomly determining a timing of execution of an authentication process according to the authentication request; and executing the authentication process at the determined timing.

Further, according to another example embodiment, a non-transitory computer-readable storage medium stores an authentication program that is capable of being executed by an electronic control unit and is configured to: acquire an authentication request from a difference device; randomly determine a timing of execution of an authentication process according to the authentication request; and execute the authentication process at the determined timing.

According to the above-described configurations, the electronic control unit and the like of the present disclosure can execute the authentication process without skipping it even when it is subjected to a glitch attack.

The following will describe embodiments of the present disclosure with reference to the drawings.

Figure 1B:
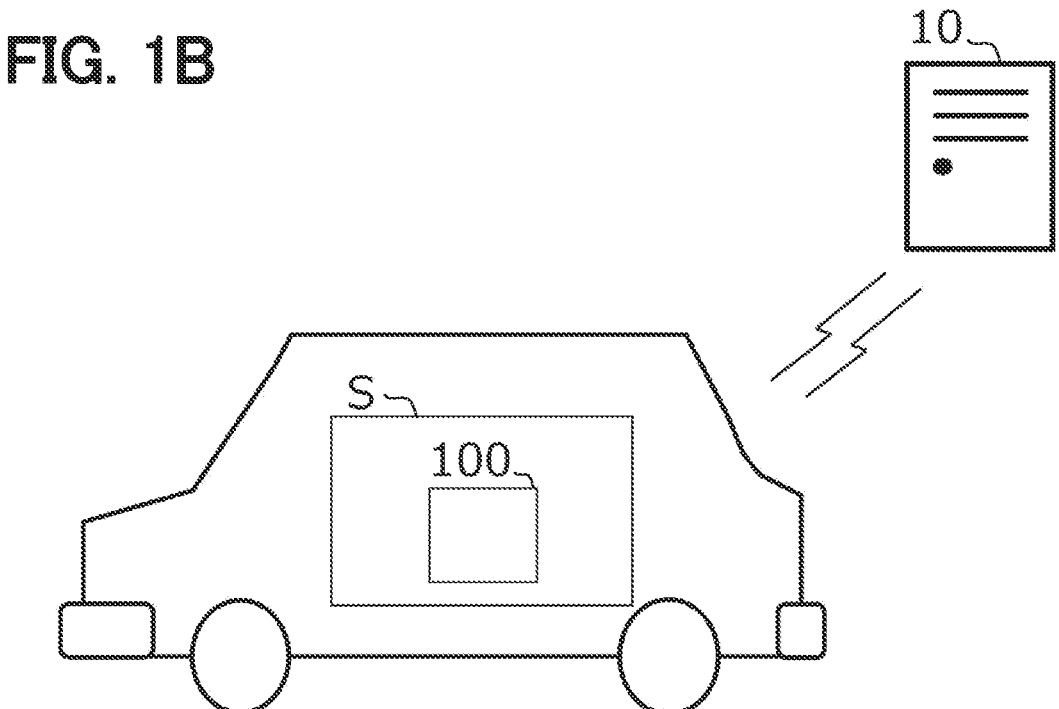

1. Arrangement of Electronic Control Unit Common to Each Embodiment and Relationship with Related Instrument FIGS. 1A and 1B are diagrams for illustrating arrangements of an electronic control unit 100 of each embodiment and a relationship with related instruments. For example, as shown in FIG. 1A, it is assumed that the electronic control unit 100 is "mounted" on a vehicle, which is a "mobile object", together with a connection instrument 10. Further, as shown in FIG. 1B, it is assumed that the electronic control unit 100 is mounted in the vehicle and the connection instrument 10 is placed outside the vehicle.

Here, the "mobile object" refers to a movable object, and a movement speed is arbitrary. The mobile object also includes the object in a stationary state. Examples of the vehicle include, but are not limited to, an automobile, a motorcycle, a bicycle, and an object mounted thereon. The term "mounted" includes not only a case where an object is directly fixed to the mobile object but also a case where an object moves together with the mobile object although the object is not fixed to the mobile object. The term "mounted" also includes a case where the device is carried by a person in the mobile object, which is a vehicle, or a case where the device is mounted on a load located to be carried by the mobile object.

The electronic control unit 100 may include a general-purpose CPU (Central Processing Unit), a volatile memory such as RAM, a non-volatile memory such as ROM, flash memory, or hard disk, various interfaces, and an internal bus connecting them. By executing software on these hardware, a function of each functional block illustrated in FIG. 2 described later can be exhibited. Of course, the electronic control unit 100 may be implemented by dedicated hardware such as an LSI.

Although the electronic control unit 100 is assumed to be in the form of an electronic control unit as a semi-finished product in the following embodiments, the present disclosure is not limited to this. For example, as a component, the electronic control unit 100 may be implemented by a semiconductor circuit or a semiconductor module. As a semi-finished product, the electronic control unit 100 may be implemented by an electronic control device, an electronic control unit, a microcomputer and a system board. As a finished product, the electronic control unit 100 may be implemented by a server, a workstation, a personal computer (PC), a tablet, a mobile router, a smartphone, a mobile phone and a navigation system. The electronic control unit 100 may include a single ECU or multiple ECUs.

The connection instrument 10 only needs to be communicably connected to the electronic control unit 100, and the form of the unit does not matter. That is, like the electronic control unit 100, it may be a component, a semi-finished product, or a finished product. For example, in the example shown in FIG. 1A, the connection instrument 10 is another electronic control unit mounted on a vehicle. In the example shown in FIG. 1B, the connection instrument 10 is a server, a mobile terminal, vehicle digital keys, or the like.

2. First Embodiment

(1) Configuration of Electronic Control Unit 100

Figure 2:
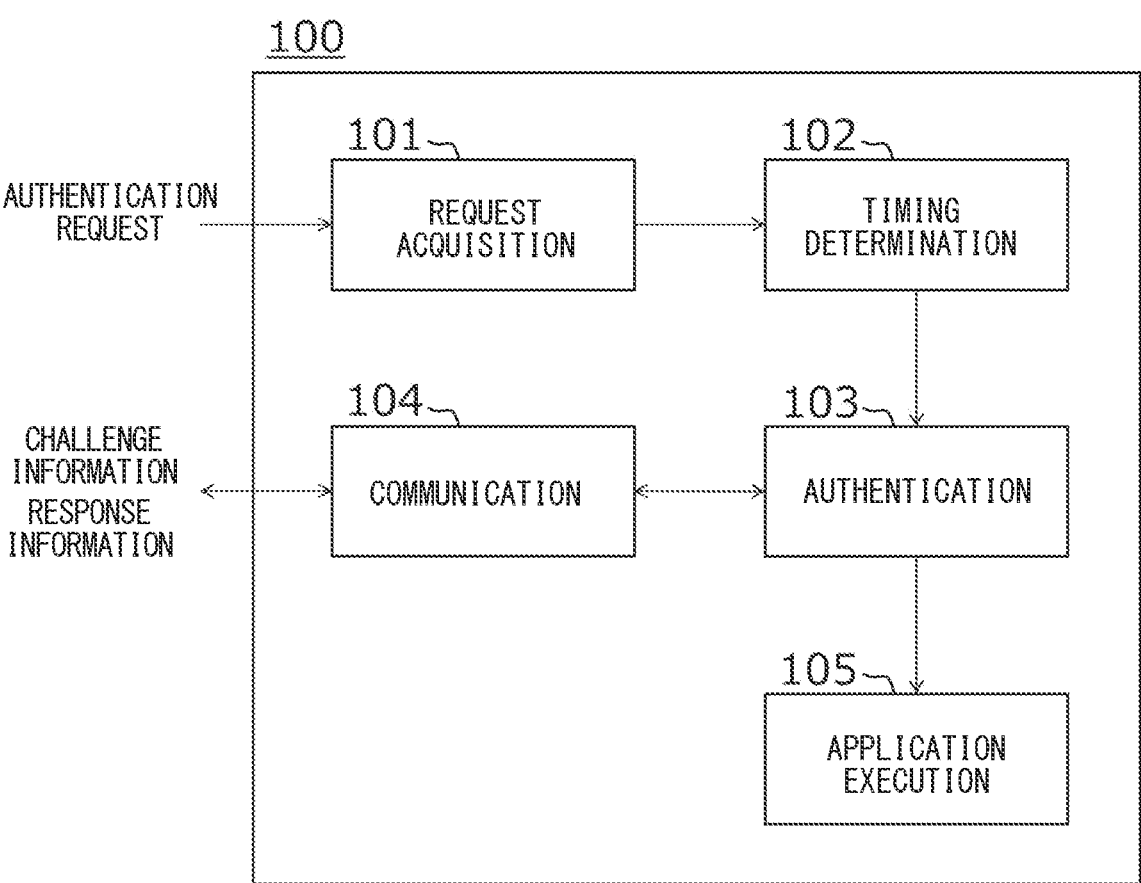
FIG. 2 is a diagram for illustrating a configuration example of the electronic control unit according to a first embodiment.

A configuration example of the electronic control unit 100 will be described with reference to FIG. 2. The electronic control unit 100 includes a request acquisition unit 101, a timing determination unit 102, an authentication unit 103, a communication unit 104, and an application execution unit 105.

The request acquisition unit 101 acquires an authentication request from a connection instrument (corresponding to "a different device") 10 connected to the electronic control unit 100.

In this embodiment, a case will be described in which the connection instrument 10 requests authentication from the electronic control unit 100 in order to execute an application installed in the electronic control unit 100, but the present disclosure is not limited to this example. For example, when the electronic control unit 100 is a device that provides an interface for accessing resources for debugging, authentication may be required to prevent unauthorized access to the resources. Therefore, the connection instrument 10 may request authentication from the electronic control unit 100 in order to use the debug function that the electronic control unit 100 has.

When the request acquisition unit 101 acquires an authentication request from the connection instrument 10, the timing determination unit 102 randomly determines a "timing" for executing the authentication process for the authentication request. Hereinafter, the timing determined by the timing determination unit 102 will be referred to as an authentication timing. The timing determination unit 102 randomly determines the authentication timing using, for example, a random number generation function (not shown).

The timing determination unit 102 may determine the authentication timing by randomly determining the time at which the authentication unit 103 executes the authentication process, or determine the authentication timing by randomly determining a "period" from when the electronic control unit 100 executes a predetermined process until the authentication unit 103 executes the authentication process. Details of the authentication timing will be described later.

Here, "determining the timing" includes not only determining a specific time to execute the authentication process, but also determining the length of time until the authentication process is executed. The "period" may be anything that indicates a time interval, and includes not only time but also the number of clock pulses and the like.

The authentication unit 103 executes the authentication process at the authentication timing determined by the timing determination unit 102. In the present embodiment, a configuration in which the authentication unit 103 executes the authentication process using a challenge-response method will be described as an example. However, the authentication unit 103 can execute the authentication process using any method. For example, the authentication unit 103 may execute the authentication process using a digital signature method, a MAC (Message Authentication Code) method, a SCRAM (Salted Challenge Response Authentication Mechanism) method, or the like.

The communication unit 104 communicates with the connection instrument 10 based on instructions from the authentication unit 103. For example, when the authentication unit 103 executes the authentication process using the challenge-response method, the communication unit 104 transmits challenge information generated by the authentication unit 103 to the connection instrument 10 based on instructions from the authentication unit 103, and receives the response information transmitted from the connection instrument 10.

The application execution unit 105 executes the application when the authentication process by the authentication unit 103 is successful.

Next, the authentication timing determined by the timing determination unit 102 will be described. As described above, the authentication unit 103 of this embodiment executes the authentication process using the challenge-response method. Therefore, the timing determination unit 102 of this embodiment determines the period from when the challenge information is transmitted to the connection instrument 10 until the authentication process is executed as the authentication timing. As an example, the timing determination unit 102 determines the authentication timing by setting the time corresponding to a random number generated by a random number generation function as the time from transmitting the challenge information to executing the authentication process.

In another example, the timing determination unit 102 may determine the time from when the request acquisition unit 101 acquires the authentication request until the authentication process is executed as the authentication timing. As in the above example, the timing determination unit 102 determines the authentication timing by setting the time corresponding to the random number generated by the random number generation function as the time from obtaining the authentication request to executing the authentication process.

In yet another example, the timing determination unit 102 determines the period that is the difference between the reference timing, which is the reference timing at which the authentication unit 103 executes the authentication process, and the timing at which the authentication unit 103 actually executes the authentication process, as the authentication timing. For example, it is assumed that the reference timing at which the authentication unit 103 executes the authentication process is set to 100 msec (milliseconds) after the request acquisition unit 101 acquires the authentication request. In this case, the timing determination unit 102 randomly determines the period of difference between the reference timing and the timing at which the authentication unit 103 executes the authentication process. For example, when the period randomly determined by the timing determination unit 102 is 5 msec, the authentication timing is determined to be 5 msec after the reference timing.

In yet another example, the timing determination unit 102 may determine the authentication timing based on the number of clock pulses instead of time. The electronic control unit 100 operates according to clock pulses. Therefore, the timing determination unit 102 determines, as the authentication timing, the number of clock pulses from when the challenge information is transmitted to the connection instrument 10 until the authentication process is executed, the number of clock pulses from when the authentication request is acquired until the authentication unit 103 executes the authentication process, or, the number of clock pulses, which is the difference between the reference timing and the timing at which the authentication unit 103 executes the authentication process.

Note that a limit may be set on the time from the acquisition of the authentication request to completion of the authentication process. In such a case, when the authentication process is not completed within the time limit, it is determined that the authentication process has failed. Therefore, when a time limit is set, the timing determination unit 103 may randomly determine the authentication timing so that it falls within the predetermined time limit.

(2) Operation of Electronic Control Unit 100

Figure 3:
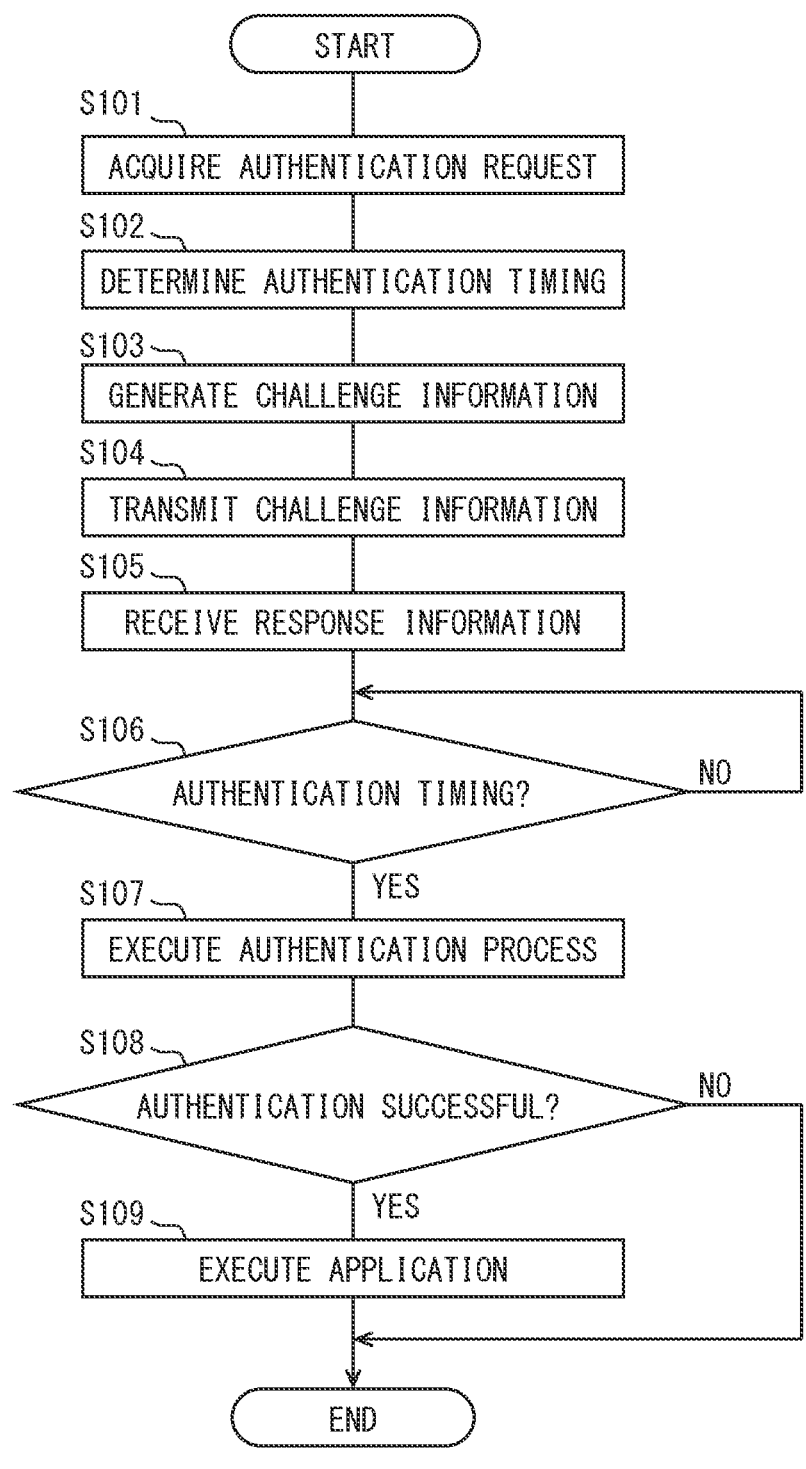
FIG. 3 is a diagram for illustrating an operation of the electronic control unit according to the first embodiment.
Figure 4:
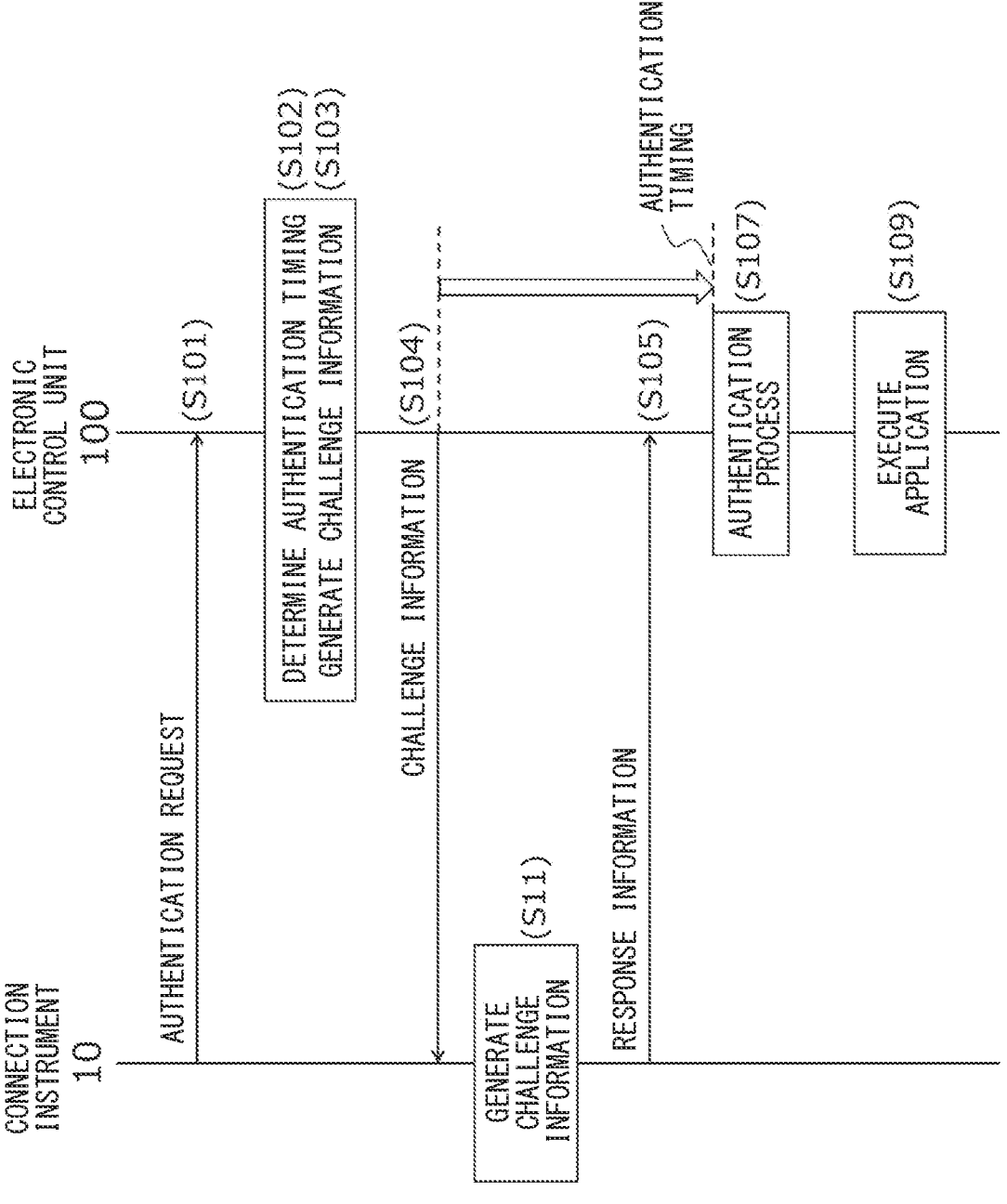
FIG. 4 is a diagram for illustrating operations of the electronic control unit and a connection instrument according to the first embodiment.

Next, operations of the electronic control unit 100 and the connection instrument 10 connected to the electronic control unit 100 will be described with reference to FIGS. 3 and 4. FIGS. 3 and 4 not only show the authentication method executed by the electronic control unit 100, but also show the process procedure of the authentication program that can be executed by the electronic control unit 100. These processes are not limited to the order shown in FIG. 3 and FIG. 4. That is, the order may be changed as long as there are no restrictions such as a relationship in which a result of the preceding step is used in a certain step. In FIG. 3 and FIG. 4, common processes are marked with the same reference numerals. The same applies to FIGS. 6 and 7, which will be described later.

The request acquisition unit 101 acquires an authentication request from the connection instrument 10 (S101). The timing determination unit 102 randomly determines the timing for executing the authentication process for the authentication request acquired in S101 (S102). For example, the timing determination unit 102 determines the period from when the communication unit 104 transmits the challenge information until the authentication unit 103 executes the authentication process as the authentication timing. The authentication unit 103 generates challenge information in order to execute the authentication process using the challenge-response method (S103). The communication unit 104 transmits the challenge information generated in S102 to the connection instrument 10 based on the instruction from the authentication unit 103 (S104). At this time, the authentication unit 103 starts measuring the period after transmitting the challenge information in S104.

When the connection instrument 10 receives the challenge information from the electronic control unit 100, it generates response information using the received challenge information (S11). Then, the connection instrument 10 transmits the generated response information to the electronic control unit 100.

The communication unit 104 receives response information from the connection instrument 10 (S105). Here, when the authentication timing has come (S106: Y), that is, when the period determined in S102 has elapsed since the communication unit 104 transmitted the challenge information to the connection instrument 10 in S103, the authentication unit 103 executes the authentication process (S107).

When the authentication unit 103 executes the authentication process in S107 and the authentication is successful (S108), the application execution unit 105 executes the application (S109).

Note that FIGS. 3 and 4 illustrate the operation of the electronic control unit 100 when the authentication unit 103 executes the authentication process using the challenge-response method. Accordingly, when the authentication unit 103 executes the authentication process using a different method, the process shown in FIGS. 3 and 4 is changed as appropriate depending on the method. For example, when using a method other than the challenge-response method, the processes of S103 to S105 in FIGS. 3 and 4 are not executed.

(3) Relationship Between Electronic Control Unit 100 and Glitch Attack

Next, with reference to FIG. 5, the relationship between electronic control unit 100 and glitch attacks will be described. A part (a) of FIG. 5 is a diagram for illustrating a comparative authentication process, and a part (b) of FIG. 5 is a diagram for illustrating an authentication process according to this embodiment.

The part (a) of FIG. 5 schematically shows a series of processes in which the communication unit 104 transmits challenge information to the connection instrument 10, executes the authentication process after a predetermined period has elapsed, and executes an application when the authentication process is successful. The part (a) of FIG. 5 further shows the voltage change caused by the glitch attack and the clock pulse caused by the voltage change.

In the comparative authentication process, since the authentication process is executed after a predetermined period has elapsed after the electronic control unit 100 transmits the challenge information, the glitch attack may be targeted at the timing when the authentication process is executed. The part (a) of FIG. 5 shows a case where the glitch attack occurs at the timing of executing the authentication process. For example, when a voltage is applied due to a power supply glitch attack, abnormal clock pulses are generated. Alternatively, abnormal clock pulses may be directly generated by the clock glitch attack. In this case, a process scheduled to be executed with the corresponding clock may be skipped. The part (a) of FIG. 5, although the authentication process was scheduled to be executed using the corresponding clock, the authentication process is skipped because the abnormal clock pulse is generated. As a result, the application will be executed regardless of whether the authentication process is successful.

On the other hand, the part (b) of FIG. 5 shows the authentication process according to this embodiment. As described above, in this embodiment, the timing determination unit 102 randomly determines the period from when the communication unit 104 transmits the challenge information until the authentication unit 103 executes the authentication process. Therefore, an attacker cannot predict the timing at which the authentication process will be executed, and there is a low possibility that the glitch attack will occur at the timing at which the authentication process is executed. As a result, the timing at which the glitch attack occurs, or even the timing at which the abnormal clock pulse is generated, is different from the timing at which the authentication process is executed, so that the authentication process is executed normally.

Note that, regarding the period from when the communication unit 104 transmits the challenge information until the authentication process is executed, the randomly determined period shown in the part (b) of FIG. 5 of this embodiment is longer than the predetermined period shown in the part (a) of FIG. 5. Therefore, a waiting time occurs between when the communication unit 104 receives the response information and when the authentication unit 103 executes the authentication process. Therefore, the application execution unit 105 may execute a process necessary for executing the application in advance during the waiting time until the authentication unit 103 executes the authentication process. However, since this is before the authentication process by the authentication unit 103 is executed, it is desirable that the process executed by the application execution unit 105 during the waiting time is a process that does not affect the security of the electronic control unit 100.

(4) Short Overview

As described above, according to this embodiment, by randomly determining the timing to execute the authentication process, it is possible to avoid the glitch attack tailored to the authentication process, and prevent the authentication processing from being skipped due to the glitch attack. Furthermore, according to the present embodiment, it is possible to prevent the authentication process from being skipped even when the device is subjected to not only the clock glitch attack but also the power supply glitch attack that applies the abnormal voltage.

3. Second Embodiment

In the first embodiment, the electronic control unit 100 is described in which the authentication unit 103 executes the authentication process at the timing determined by the timing determination unit 102. In this embodiment, a configuration will be described in which the electronic control unit 100 executes the authentication process at a timing determined in response to an acquired authentication request or immediately executes the authentication process. Since the configuration of the electronic control unit 100 of this embodiment is basically the same as the electronic control unit 100 of the first embodiment, with reference to FIG. 2, the differences from the first embodiment will be mainly described.

The request acquisition unit 101 of this embodiment acquires a plurality of different authentication requests. In the embodiment below, an example will be described in which the request acquisition unit 101 acquires two authentication requests, in other words, a first authentication request and a second authentication request. The first authentication request is, for example, an authentication request for a predetermined "message," and the second authentication request is an authentication request for a message different from the predetermined message.

Here, the "message" is a collection of data transmitted and received with an electronic control unit, and includes data frames and data blocks.

The electronic control unit 100 executes the same process as in the first embodiment in response to the first authentication request. That is, the timing determination unit 102 randomly determines the timing for executing the authentication process, and the authentication unit 103 executes the authentication process at the authentication timing determined by the timing determination unit 102.

On the other hand, the timing determination unit 102 does not determine the authentication timing for the second authentication request. Then, the authentication unit 103 "immediately" executes the authentication process for the authentication request. For example, the authentication unit 103 may execute the authentication process without delay after acquiring the authentication request. Alternatively, when the authentication unit 103 executes the authentication process using the challenge-response method, the authentication unit 103 may execute the authentication process without delay after receiving the response information from the connection instrument 10.

Here, the expression of "immediately" includes the case after making necessary preparations for executing the authentication process.

That is, in the present embodiment, the electronic control unit 100 may execute the authentication process at a specific authentication timing after acquiring the authentication request, or may execute the authentication process immediately after acquiring the authentication request.

The predetermined message is, for example, a message with high importance. When a message related to vehicle travel control is forged by an attacker and the authentication process is not executed due to the glitch attack, the vehicle travel control may be hijacked by the malicious attacker. Therefore, it is desirable to reliably execute the authentication process on messages of high importance, such as messages related to vehicle travel control. Therefore, when the authentication request is for a message whose importance level is higher than a predetermined threshold value, the authentication process is executed at a randomly determined authentication timing by the timing determination unit 102, as described in the first embodiment. Note that the determination unit (not shown) of the electronic control unit 100 may determine whether the importance of the message for which authentication is requested is higher than a predetermined threshold value, depending on the content of the message. However, the identification information and CAN-IDs of messages whose importance is higher than a predetermined threshold may be stored in advance. In this case, when the identification information or CAN-ID of the message for which authentication is requested corresponds to pre-stored identification information or CAN-ID, the determination unit can determine the request as the authentication request for the message whose importance is higher than a predetermined threshold. The message identification information and CAN-ID are stored by the dealer or vehicle manufacturer.

Here, the expression of "higher than" includes both cases where the value is the same as the comparison target and cases where it is not.

Another example of a predetermined message is a message where there are no restrictions on the speed or time of the authentication process. For example, when the authentication process is executed at the authentication timing determined by the timing determination unit 102, the time required to complete the authentication process becomes longer than when the authentication process is executed immediately. Therefore, for messages that require the immediate authentication process, the authentication process is executed immediately. For messages that have no restrictions on the speed or time of the authentication process, the authentication process is executed, at the authentication timing is randomly determined by the timing determination unit 102.

In yet another example, the predetermined message is, for example, a message transmitted from the connection instrument 10 located outside the vehicle. When the connection instrument 10 is located outside the vehicle, the transmitted authentication request is more likely to be transmitted by a malicious attacker than when the connection instrument 10 is located inside the vehicle. Therefore, as shown in FIG. 1A, it is desirable that authentication process be reliably executed for the authentication request transmitted from the connection instrument 10 located outside the vehicle. Therefore, when the authentication request is for the message transmitted from the outside of the vehicle, the authentication process is executed at the randomly determined authentication timing by the timing determination unit 102, as described in the first embodiment. On the other hand, as shown in FIG. 1B, for the authentication request transmitted from the connection instrument 10 located inside the vehicle, the authentication process is executed immediately after the authentication request is acquired.

Figure 6:
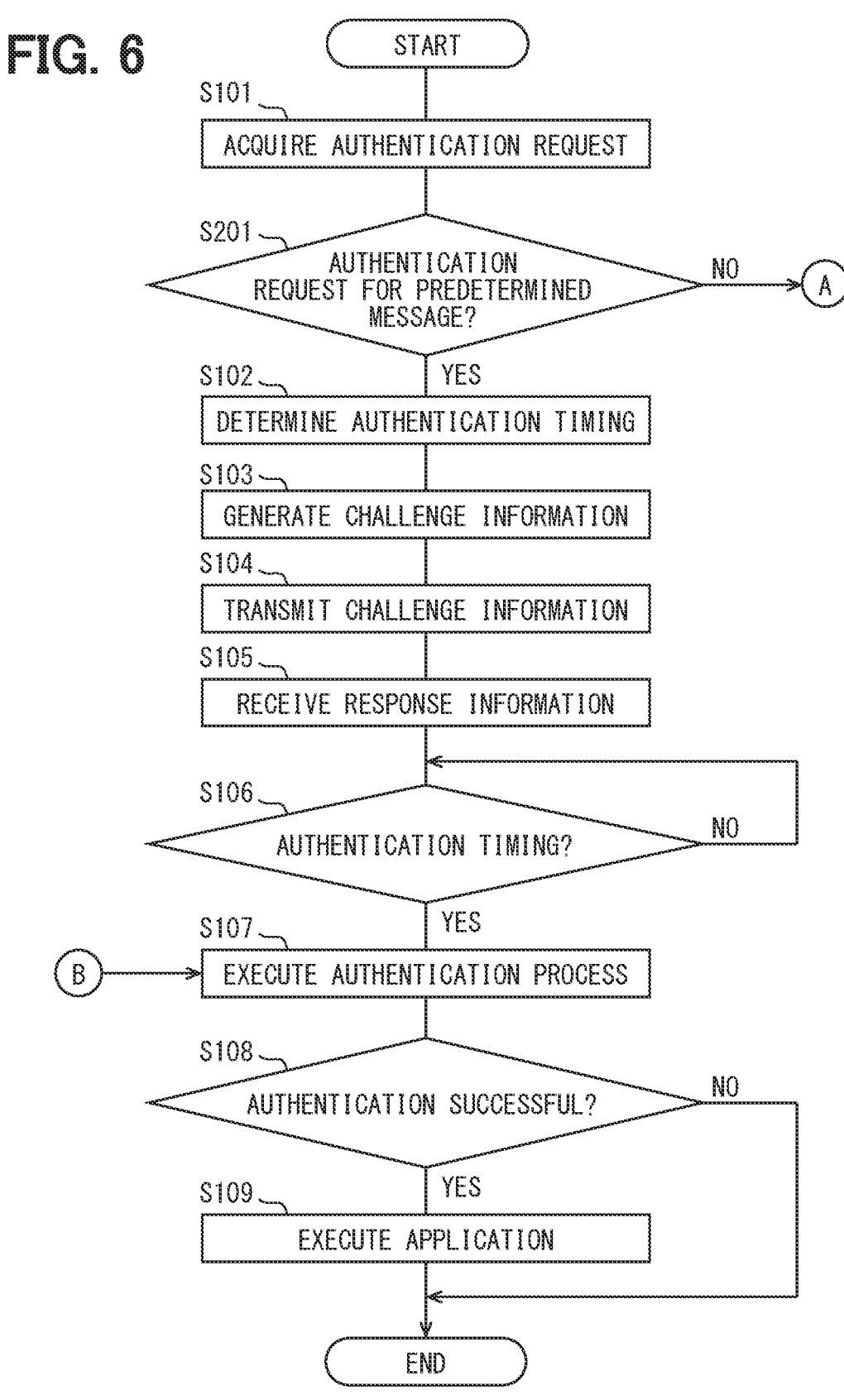
FIG. 6 is a diagram for illustrating an operation of the electronic control unit according to a second embodiment.
Figure 7:
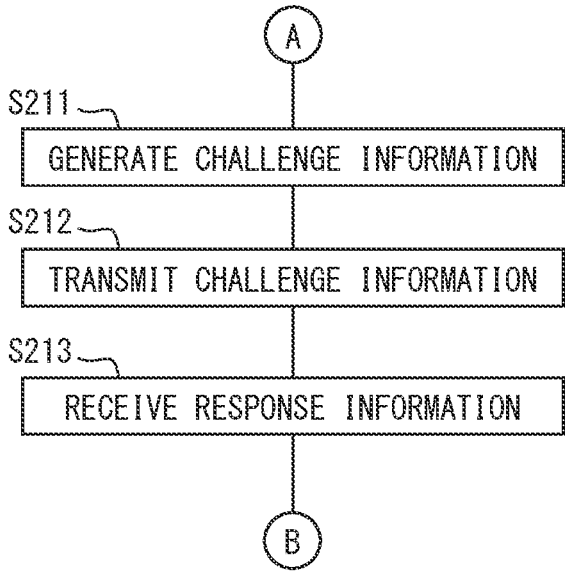
FIG. 7 is a diagram for illustrating an operation of the electronic control unit according to the second embodiment.

The operation of the electronic control unit 100 of this embodiment will be described with reference to FIGS. 6 and 7. Processes common to those in FIGS. 3 and 4 are designated by the same reference numerals as those in FIGS. 3 and 4, and description thereof will be omitted.

The request acquisition unit 101 determines whether the authentication request acquired from the connection instrument 10 is an authentication request for a predetermined message (S201). Here, when the authentication request acquired in S101 is an authentication request for a predetermined message (S201: Y), the processes from S102 onwards are executed as in the first embodiment.

On the other hand, when the authentication request is not for a predetermined message (S201: N), the process shown in FIG. 7 is executed. Specifically, the authentication unit 103 generates challenge information in order to execute the authentication process using the challenge-response method (S211). The communication unit 104 transmits the challenge information generated in S211 to the connection instrument 10 based on the instruction from the authentication unit 103 (S212). The communication unit 104 then receives response information from the connection instrument 10 (S213). Note that each process of S211, S212, and S213 is the same as each process of S103, S104, and S105 shown in FIG. 6.

As described above, according to the present embodiment, the electronic control unit 100 can execute the authentication process at random timing or immediately according to the message.

4. Modification

Figure 8:
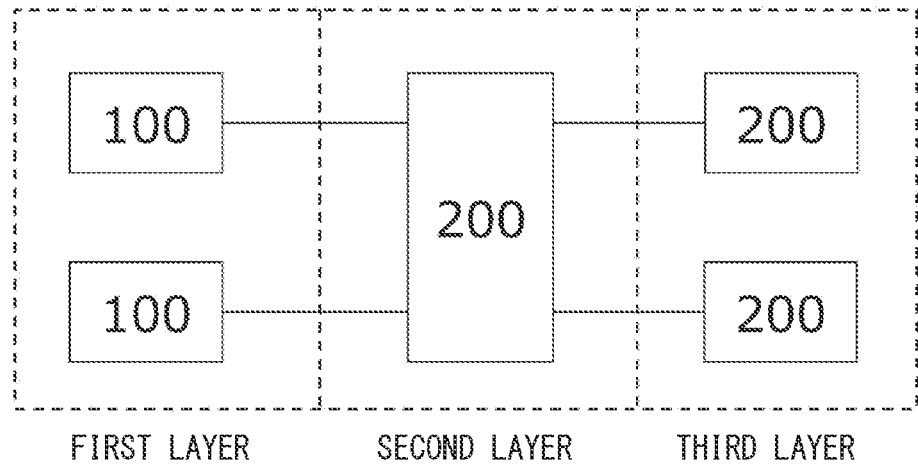
FIG. 8 is a diagram for explaining a configuration example of an electronic control system according to a modification of each embodiment.
Figure 9:
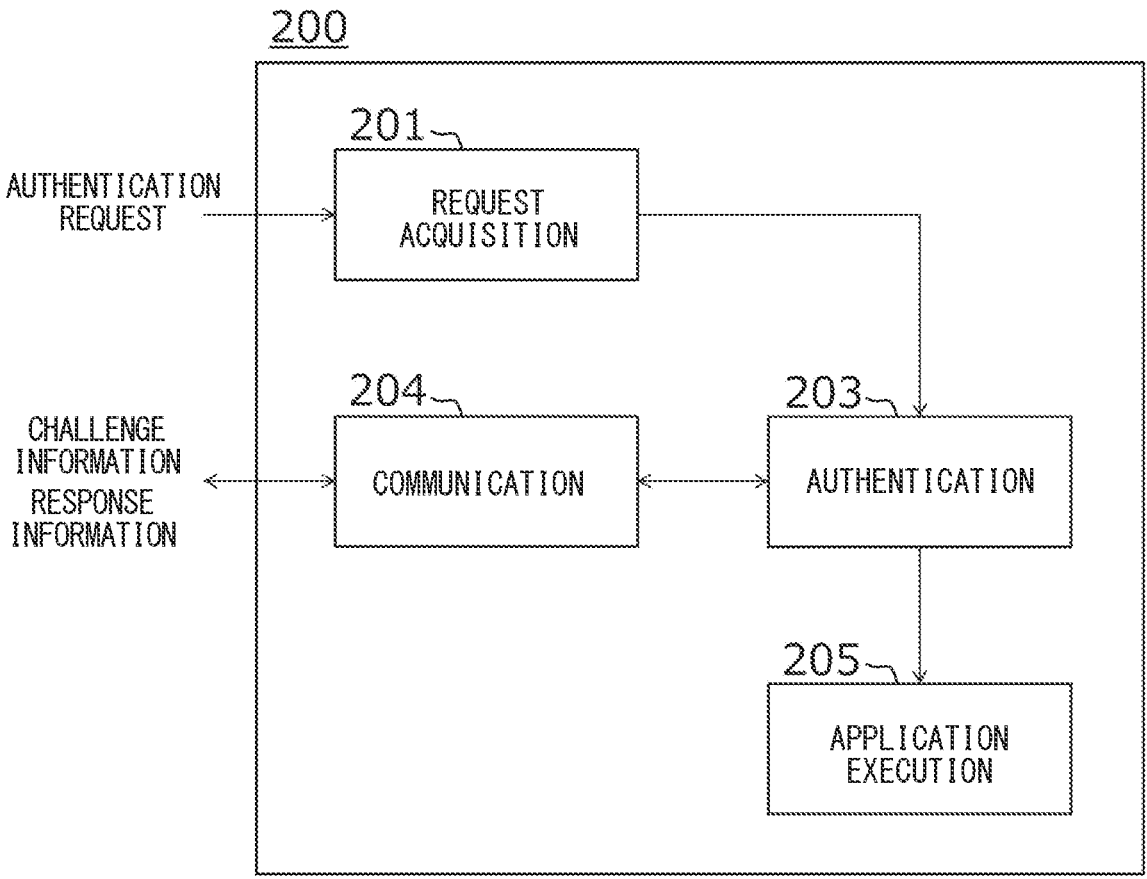
FIG. 9 is a diagram for illustrating a configuration example of the electronic control unit in the electronic control system according to the modification of each embodiment.

Next, a modification of the first embodiment and the second embodiment will be described with reference to FIGS. 8 and 9. FIG. 8 is a schematic diagram of an electronic control system S mounted on a vehicle, which is a mobile object. The electronic control system S includes a plurality of electronic control units including the electronic control unit 100. The electronic control system S shown in FIG. 8 employs a multilayer defense system that protects the security of the vehicle.

The multilayer defense is known as a defense method that provides, as a countermeasure against attacks, security functions hierarchically in multiple layers. In a system that employs the multilayer defense, even when the first countermeasure (that is, the first layer) is breached in the event of an attack, the next countermeasure (that is, the second layer) will protect against the attack. Even when the next countermeasure is breached, the next countermeasure (that is, the third layer) can protect against the attack. Therefore, it is possible to increase the defense power. That is, a system that employ the multilayer defense will have multiple layers divided according to "security level." The electronic control system S shown in FIG. 8 is provided with three layers (a first layer, a second layer, and a third layer).

The term "security level" is an index indicating security against attacks or defense against attacks.

Among the electronic control units configuring the electronic control system S shown in FIG. 8, the electronic control unit 100 is the electronic control unit 100 described in the first embodiment and the second embodiment. Therefore, when the request acquisition unit 101 (corresponding to a "first request acquisition unit") acquires an authentication request (corresponding to a "first authentication request"), the timing determination unit 102 randomly determines the authentication timing. The authentication unit (corresponding to a "first authentication unit") 103 executes the authentication process (corresponding to a "first authentication process") at the authentication timing determined by the timing determination unit 102.

In contrast, a configuration example of an electronic control unit 200 that constitutes the electronic control system S will be described using FIG. 9. The electronic control device 200 includes a request acquisition unit 201, an authentication unit 203, a communication unit 204, and an application execution unit 205, each of which has the same function as the corresponding configuration of the electronic control unit 100. However, unlike the electronic control unit 100 shown in FIG. 2, the electronic control unit 200 does not have the timing determination unit. Therefore, in the electronic control unit 200, when the request acquisition unit 201 (corresponding to a "second request acquisition unit") acquires an authentication request (corresponding to a "second authentication request"), the authentication unit 203 (corresponding to a "second authentication unit") immediately executes the authentication process (corresponding to a "second authentication process") in response to the authentication request.

Accordingly, the electronic control system S includes an electronic control unit 100 (corresponding to "first electronic control device") that executes the authentication process at the random timing, and an electronic control device 200 (corresponding to a "first electronic control device") that executes the authentication process immediately upon acquiring an authentication request. This system includes a second electronic control device (corresponding to a second electronic control device).

In the example shown in FIG. 8, the electronic control unit 100 belongs to the first layer, and the electronic control unit 200 belongs to the second or third layer. The first layer of the multilayer defense is the lowest security level, so it is most likely to be attacked. Further, the electronic control device of the first layer is often an electronic control unit that communicates with the outside of the vehicle, and there is a high possibility of acquiring the authentication request transmitted from the attacker. On the other hand, the second and third layers of the multilayer defense have a higher security level than the first layer, and are less likely to be attacked than the first layer. Therefore, the electronic control unit 100 is provided in the first layer to execute the authentication process reliably, thereby preventing attacks from the outside. On the other hand, layers with a high security level such as the second layer and the third layer are provided with an electronic control unit 200 that does not execute the authentication process at random timing.

Although FIG. 8 describes an example in which the electronic control unit 100 is provided in the first layer, and the electronic control unit 200 is provided in the second and third layers, the present disclosure is not limited to this example. For example, the electronic control unit 100 may be provided in the second layer.

Further, in FIG. 8, an example has been described in which the electronic control system S includes the electronic control unit 100 and the electronic control unit 200 having a different configuration from the electronic control device 100. However, the electronic control system S may include only the electronic control unit 100. In this case, the electronic control unit 100 belonging to the second layer or the third layer is configured so that the timing determination unit 102 immediately executes the authentication process without determining the authentication timing.

5. Overview

The features of the electronic control unit or the like according to each embodiment of the present disclosure have been described above.

Since terms used in the embodiments are examples, the terms may be replaced with synonymous terms or terms including synonymous functions.

The block diagrams used for the description of the embodiments are obtained by classifying and organizing the configurations of the devices for each function. The blocks representing the respective functions may be implemented by any combination of hardware or software. Since the blocks represent the functions, such a block diagram may also be understood as disclosures of a method and a program for implementing the method.

An order of functional blocks that can be understood as processes, flows, and methods described in the embodiments may be changed as long as there are no restrictions such as a relation in which results of preceding processes are used in one other process.

The terms such as first, second, to N-th (where N is an integer) used in each embodiment and in the claims are used to distinguish two or more configurations and methods of the same kind and are not intended to limit the order or superiority.

Further, examples of the form of the electronic control unit of the present disclosure include the following. Examples of a form of a component include a semiconductor element, an electronic circuit, a module, and a microcomputer. Examples of a form of a semi-finished product include an electric control unit (ECU) and a system board.

Examples of a form of a finished product include a cellular phone, a smartphone, a tablet computer, a personal computer (PC), a workstation, and a server. In addition, the devices may include a device having a communication function or the like, and examples thereof include a video camera, a still camera, and a car navigation system.

In addition, necessary functions such as an antenna and a communication interface may be added to the electronic control unit.

The present disclosure is implemented not only by dedicated hardware having a configuration and a function described in relation to each embodiment. The present disclosure can also be implemented as a combination of a program for implementing the present disclosure, recorded on such a recording medium as memory and a hard disk and general-purpose hardware including dedicated or general-purpose CPU, memory, or the like, capable of executing the program.

A program stored in a non-transitory tangible storage medium (for example, an external storage device (a hard disk, a USB memory, and a CD/BD) of dedicated or general-purpose hardware, or an internal storage device (a RAM, a ROM, and the like)) may also be provided to dedicated or general-purpose hardware via the recording medium or from a server via a communication line without using the recording medium. Thereby, the latest functions can be provided at all times through program upgrade.

INDUSTRIAL APPLICABILITY

The electronic control unit of the present disclosure is applicable to any general product including a microcomputer.

The electronic control unit 100 may open or close a door of a mobile object (for example, vehicle) or activate an engine, or the like based on the result of the authentication process.

The electronic control unit and the method described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

The invention claimed is:

1. An electronic control unit comprising:
   at least one of a circuit and a processor with a memory storing computer program code executable by the processor, the at least one of the circuit and the processor configured to cause the electronic control unit to:
   acquire an authentication request from a different device that includes at least one of (i) a different circuit and (ii) a different processor with a different memory storing different computer program code executable by the different processor;
   randomly determine a timing of execution of an authentication process according to the authentication request; and
   execute the authentication process at the determined timing;
   wherein the timing of execution of the authentication process is determined as a period between transmission of challenge information to the different device and execution of the authentication process;
   acquire a second authentication request different from the authentication request, immediately execute a second authentication process according to the second authentication request; and
   wherein the authentication request is for a predetermined message, and the second authentication request is for a message different from the predetermined message.

2. The electronic control unit according to claim 1, wherein:
   the timing of execution of the authentication process is determined as a period from acquisition of the authentication request to execution of the authentication process.

3. The electronic control unit according to claim 1, wherein:
   the timing of execution of the authentication process is determined as a period that is a difference between a reference timing that is a reference for executing the authentication process and a timing at which the authentication process is executed.

4. The electronic control unit according to claim 1, wherein to execute the authentication process using a challenge-response method.

5. The electronic control unit according to claim 1, wherein the at least one of the circuit and the processor configured to cause the electronic control unit to:
   acquire a second authentication request different from the authentication request, and
   immediately execute a second authentication process according to the second authentication request.

6. The electronic control unit according to claim 5, wherein:
   the authentication request is for a predetermined message, and
   the second authentication request is for a message different from the predetermined message.

7. The electronic control unit according to claim 6, wherein:
   the predetermined message is a message with an importance higher than a predetermined threshold.

8. The electronic control unit according to claim 6, wherein:
   the electronic control unit is mounted on a mobile object, and
   the predetermined message is a message transmitted from an outside of the mobile object.

9. An electronic control system comprising: a first electronic control unit; and a second electronic control unit, wherein:
   the first electronic control unit includes at least one of a first circuit and a first processor with a first memory storing first computer program code executable by the first processor, the at least one of the first circuit and the first processor configured to cause the first electronic control unit to:
   acquire a first authentication request from a different device that includes at least one of a different circuit and a different processor with a different memory storing different computer program code executable by the different processor;
   randomly determine a timing of execution of a first authentication process according to the first authentication request when the first authentication request is acquired; and
   execute the first authentication process at the determined timing, the timing of executing of the first authentication process determined as a period between transmission of challenge information to the different device and execution of the first authentication process; and
   the second electronic control unit includes at least one of a second circuit and a second processor with a second memory storing second computer program code executable by the second processor, the at least one of the second circuit and the second processor configured to cause the second electronic control unit to:
   acquire a second authentication request; and
   immediately execute a second authentication process on the second authentication request when the second authentication request is acquired.

10. The electronic control system according to claim 9, wherein:
    the electronic control system has a plurality of layers obtained by dividing the electronic control system according to a security level, and the first electronic control unit belongs to a layer with the security level lower than a layer to which the second electronic control unit belongs.

11. An authentication method executed by an electronic control unit, the method comprising:

acquiring an authentication request from a different device that includes at least one of a circuit and a processor with a memory storing computer program code executable by the processor;

randomly determining a timing of execution of an authentication process according to the authentication request; and executing the authentication process at the determined timing;

wherein the timing of execution of the authentication process is determined as a period between transmission of challenge information to the different device and execution of the authentication process;

acquire a second authentication request different from the authentication request, immediately execute a second authentication process according to the second authentication request; and wherein the authentication request is for a predetermined message, and the second authentication request is for a message different from the predetermined message.

12. A non-transitory computer-readable storage medium storing an authentication program that is executed by an electronic control unit and configured to:

acquire an authentication request from a different device that includes at least one of a circuit and a processor with a memory storing computer program code executable by the processor;

randomly determine a timing of execution of an authentication process according to the authentication request; and execute the authentication process at the determined timing;

wherein the timing of execution of the authentication process is determined as a period between transmission of challenge information to the different device and execution of the authentication process;

acquire a second authentication request different from the authentication request, immediately execute a second authentication process according to the second authentication request; and wherein the authentication request is for a predetermined message, and the second authentication request is for a message different from the predetermined message.

13. The electronic control unit according to claim 1, wherein the period between the transmission of the challenge information to the different device and the execution of the authentication process is determined to correspond to a random number generated by a random number generation function.

14. An electronic control unit comprising:

at least one of (i) a circuit and (ii) a processor with a memory storing computer program code executable by the processor, the at least one of the circuit and the processor configured to cause the electronic control unit to:

acquire a first authentication request from a different device that includes at least one of (i) a different circuit and (ii) a different processor with a different memory storing different computer program code executable by the different processor, the first authentication request being for a predetermined message;

randomly determine a timing of execution of a first authentication process according to the first authentication request;

execute the first authentication process at the determined timing;

acquire a second authentication request different from the first authentication request;

immediately execute a second authentication process according to the second authentication request, the second authentication request being for a message different from the predetermined message;

store an identification (ID) indicating a message type of a timing control target;

perform a timing control in response to an ID of the first authentication request corresponding to the stored ID; and execute the first authentication process without performing the timing control in response to the ID of the first authentication request not corresponding to the stored ID.

15. The electronic control unit according to claim 14, wherein the ID is a controller area network ID (CAN-ID).

16. The electronic control unit according to claim 14, wherein the stored ID is one of a plurality of IDs and the stored ID of the timing control target has an importance that is higher than another ID among the plurality of IDs.

17. The electronic control unit according to claim 1, wherein storing an identification (ID) indicating a message type of a timing control target;

when an ID of the authentication request corresponds to the stored ID, perform a timing control; and when the ID of the authentication request does not correspond to the stored ID, immediately execute the authentication process without performing the timing control.

* * * * *